(12) United States Patent
Heruska et al.

(10) Patent No.: US 8,750,354 B1
(45) Date of Patent: Jun. 10, 2014

(54) NEARFIELD TESTING ARCHITECTURE

(75) Inventors: William M. Heruska, Sicklerville, NJ (US); Michael Uscinowicz, Hainesport, NJ (US); Gregory A. Arlow, Southampton, NJ (US); Fred Tanjutco, Cherry Hill, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 557 days.

(21) Appl. No.: 13/104,362

(22) Filed: May 10, 2011

(51) Int. Cl.
*H04B 3/46* (2006.01)
*H04L 23/00* (2006.01)

(52) U.S. Cl.
USPC .......................................... 375/224; 375/377

(58) Field of Classification Search
CPC .. H04B 17/00; H04B 17/0007; H04B 7/0691; H04B 17/0027; H04B 17/0032; H04B 17/0035; H04B 7/0413; G01R 29/10; G01R 29/0814; G01R 27/28; G01R 35/00; H04L 43/50; H04L 1/24; H04L 23/0256
USPC ................ 375/224, 228; 324/750.02, 750.19; 343/703, 893; 455/67.16; 702/118
See application file for complete search history.

(56) References Cited

U.S. PATENT DOCUMENTS

| | | | |
|---|---|---|---|
| 4,954,834 A * | 9/1990 | Buck | 342/360 |
| 5,319,375 A * | 6/1994 | Gallegro et al. | 342/165 |
| 5,534,873 A | 7/1996 | Weichman et al. | |
| 6,084,545 A | 7/2000 | Lier et al. | |
| 6,157,343 A | 12/2000 | Andersson et al. | |
| 6,193,334 B1 * | 2/2001 | Slater et al. | 343/765 |
| 6,771,216 B2 | 8/2004 | Patel et al. | |
| 6,963,301 B2 | 11/2005 | Schantz et al. | |
| 2012/0082199 A1 * | 4/2012 | Blech | 375/224 |

OTHER PUBLICATIONS

"Near-field vs Far-field", Nearfield Systems, Inc., © 2006, Reprinted.

* cited by examiner

*Primary Examiner* — Tesfaldet Bocure
(74) *Attorney, Agent, or Firm* — Howard IP Law Group, PC

(57) ABSTRACT

An open architecture design for a digital nearfield test system for nearfield testing of a phased array antenna allows the ability to use the components of an individual phased array antenna to be tested in conjunction with a nearfield scanner probe system allowing an efficient and cost-saving "radar testing the radar" scenario.

3 Claims, 4 Drawing Sheets

*Data Sample*

NEARFIELD TESTING ARCHITECTURE

GOVERNMENT RIGHTS

This invention was made with Government support under Contract N00024-09-C-5312 awarded by the Department of the Navy. The Government has certain rights in this invention.

FIELD OF THE INVENTION

The present invention relates to nearfield testing of phased array RADAR.

BACKGROUND

Traditionally, when a phased array antenna is tested using a planar nearfield scanner, RF equipment is used to receive RF from an Array Under Test ("AUT") or transmit RF to the AUT. In order to establish a concise reference point for obtaining the key phase and amplitude deltas for determining AUT performance, the equipment is configured in such a manner that establishes a reference point at the nearfield probe and a reference point at the AUT. Typically these points are established by placing a mixer in line and using a local oscillator to phase lock the points together. During nearfield scanning measurements, data is acquired via a RF receiver where amplitude and phase measurements are determined by the delta between the reference and test points. After the entire active aperture has been scanned and data collected, the data is post processed via a Fourier Transform to obtain a pattern of the farfield energy in visible space. This method works for phased arrays that use analog beamforming.

As phased arrays become more advanced, analog beamforming has evolved into digital beamforming, that is the traditional analog beamforming networks have been replaced by digital equipment. Analog receivers and exciters have been replaced by digital receivers and exciters which greatly improve key phased array performance parameters such as signal to noise, beamforming error elimination, and clutter attenuation aided by decorrelation.

The change to digital beamforming, however, has introduced new challenges in the nearfield test methodology. When a digital array transmits to the nearfield scanner probe, a digital word is translated by the exciter digital-to-analog converter and transmitted as RF to the nearfield scanner probe. When the digital array receives from the nearfield scanner probe, an analog-to-digital converter on the digital receiver converts the analog data to digital data comprising in-phase and quadrature-phase (I/Q) data components. This I/Q data stream is then bussed to various data processing locations within the phased array radar system. In existing nearfields, the nearfield scanner probe uses an analog receiver and exciter (RxEx). The existing nearfields thus have the cumbersome problem of having to correlate digital I/Q data from the digital array with analog RF data of the nearfield scanner probe.

This disclosure describes a new method of scanning a digital beamformed phased array in a nearfield by creating an open architecture approach to replacing the analog reference points with digital reference points and the ability to perform measurements.

SUMMARY OF THE INVENTION

In one aspect of the present invention, an open architecture design for a digital nearfield test system architecture for nearfield testing of a digital phased array antenna under test is disclosed, wherein the digital phased array antenna comprises a digital receiver/exciter and an onboard processor. The digital nearfield testing architecture comprises a digital nearfield scanner probe system comprising a nearfield scanner probe connected to the digital receiver/exciter and the onboard processor, wherein when the phased array antenna under test is in transmit mode, the nearfield scanner probe detects RF signal from the phased array antenna under test and sends detected RF Rx data to the digital receiver/exciter, and when the phased array antenna under test is in receive mode, the digital receiver/exciter generates and sends RF Tx data to the digital nearfield scanner probe which then transmits an RF signal to the phased array antenna under test which generates digital I/Q data. The digital nearfield testing architecture also includes a data processing and array control unit, wherein the digital receiver/exciter and the onboard processor formats the RF Rx data from the digital nearfield scanner probe and bus the RF Rx data back to the nearfield data processing and array control unit, and a local oscillator distribution network for synchronizing operations of the components of the digital nearfield architecture. The digital nearfield scanner probe system correlates the digital RF Tx and Rx data to the digital I/Q data from the phased array antenna under test.

The benefit of the present invention is the ability to use the digital Receiver/Exciter (DRx/Ex 40 in FIG. 2) and the processor (the processor 50 in FIG. 2) from an individual AUT and hook them up to a scanner probe to create a "radar testing the radar" scenario.

BRIEF DESCRIPTION OF THE DRAWING

The present invention is best understood from the following detailed description when read in conjunction with the accompanying drawing. Like numerals denote like features throughout the specification and drawing. The drawings are schematic and are not intended to represent dimensions or scales.

DETAILED DESCRIPTION

Figure 1:
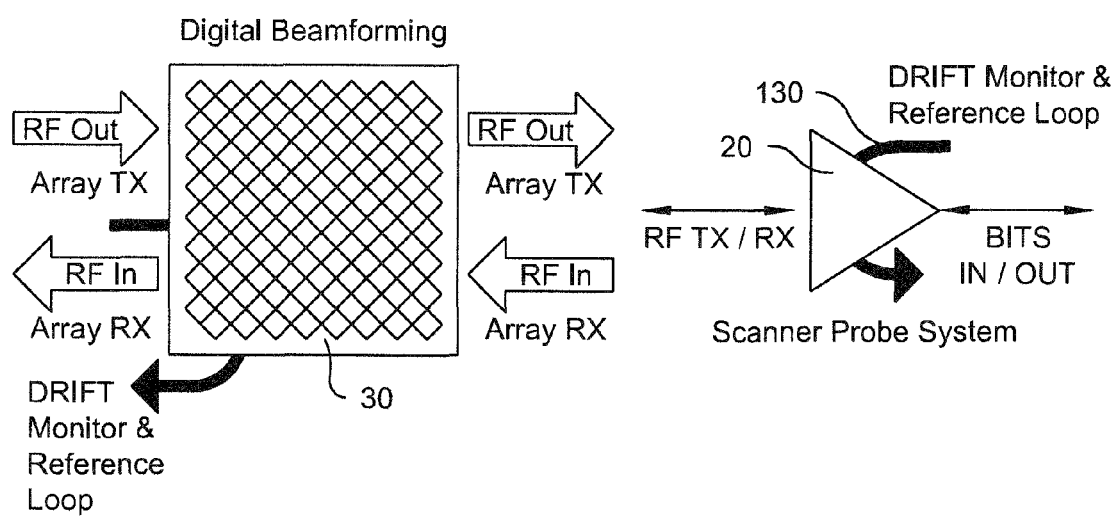
FIG. 1 is a high level schematic block diagram illustration of a digital "bits-in-bits-out" nearfield RF flow.

According to the present disclosure, in order to alleviate the problem of correlating digital I/Q data from the digital phased array with analog RF data of the nearfield scanner probe in the prior art nearfield phased array test architecture, the conventional RF subsystems containing the RF components necessary to perform RF data collection loops in phased array systems are replaced with a digitized RF subsystem to create a "bits-in-bits-out" solution. FIG. 1 shows a high level schematic block diagram of an embodiment of such a digitized RF subsystem 10. The RF subsystem 10 includes a digital phased array under test ("DAUT") 30 and a nearfield scanner probe 20 for illuminating the DAUT during testing, where the digital nearfield scanner probe 20 along with its scanner probe equipment 25 (see FIG. 2) creates a "bits-in-bits-out" nearfield test system. The "bits-in-bits-out" system is achieved by the digital nearfield architecture 100 shown in FIG. 2.

Figure 2:
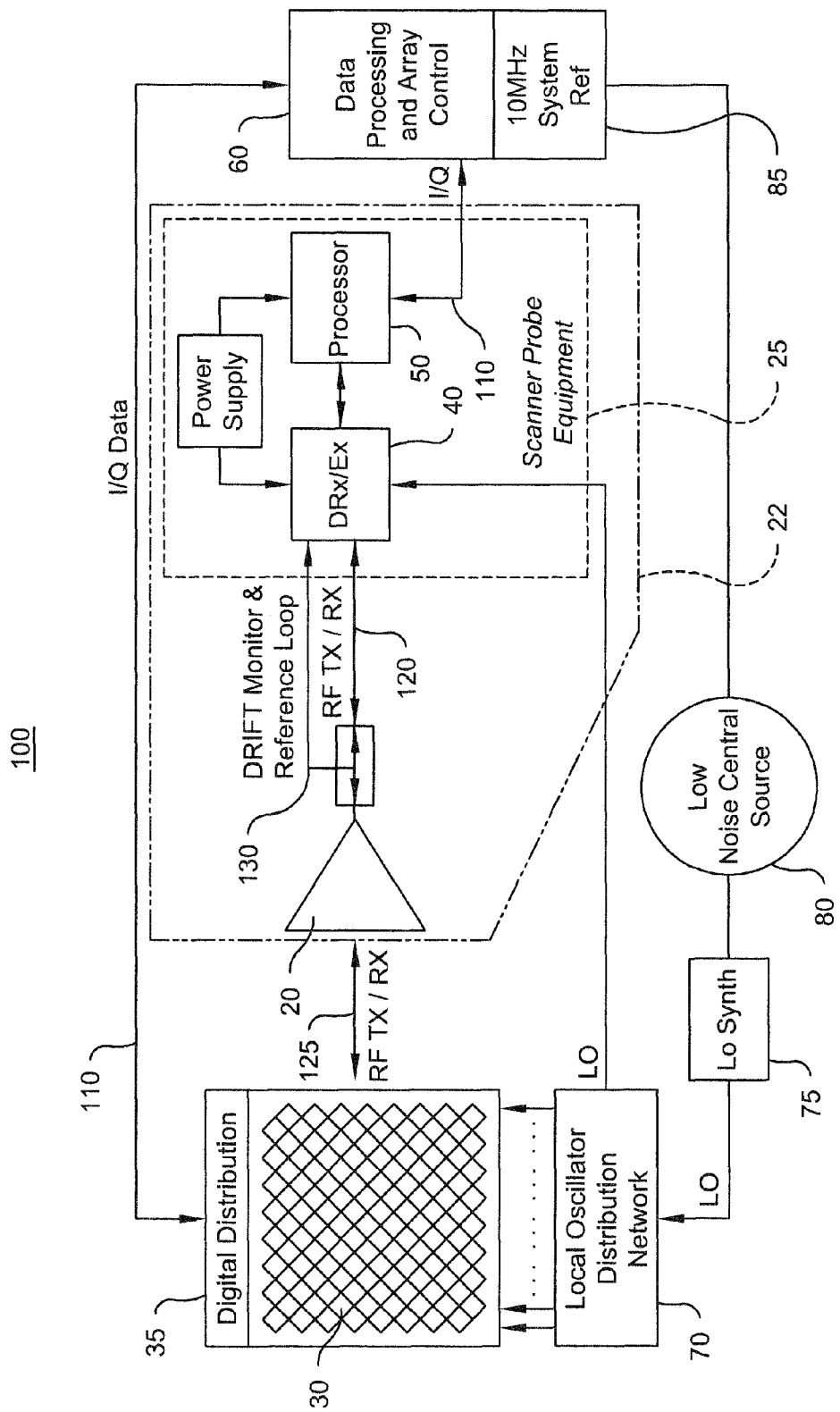
FIG. 2 is a schematic block diagram illustration of a digital nearfield architecture of the present disclosure.

Referring to FIG. 2, the digital nearfield architecture 100 according to an embodiment of the present disclosure comprises a digital phased array system that includes the DAUT 30, a data processing and array control unit 60, a digital receiver/exciter ("DRx/Ex") 40 and an onboard processor 50. The digital nearfield architecture 100 also comprises a digital nearfield scanner probe system 22. The digital nearfield scanner probe system 22 includes the nearfield scanner probe 20 and scanner probe equipment 25 that supports the operation of the nearfield scanner probe 20 during testing. According to the present disclosure, the scanner probe equipment 25 comprises the already existing components of the digital phased array system, the DRx/Ex 40 and the associated onboard processor 50.

The digital nearfield architecture 100 also includes a local oscillator distribution network 70, a local oscillator synthesizer 75, a low noise central source 80 and a system reference 85 for synchronizing the operation of all components of the digital nearfield architecture 100. The local oscillator synthesizer 75 creates the local oscillator signal used for RF mixing. The digital nearfield architecture 100 further includes a Digital Distribution 35 for distributing logic and data signals through the device under test. Different DAUTs have different distribution system.

In FIG. 2, the arrow 120 between the nearfield scanner probe 20 and a digital receiver/exciter ("DRx/Ex") 40 represents both the transmit ("Tx") and receive ("Rx") RF data exchanged between the nearfield scanner probe 20 and the DRx/Ex 40. The arrow 125 schematically represents the RF signal paths for both the Tx and Rx RF signals exchanged between the DAUT 30 and the nearfield scanner probe 20. For example, when the DAUT 30 is in Tx mode and transmits RF signals, the nearfield scanner probe 20 receives the RF signal 125 and sends the detected RF Rx data 120 to the DRx/Ex 40. When the AUT 30 is in Rx mode, the DRx/Ex 40 generates and sends RF Tx data 120 to the nearfield scanner probe 20 which then transmits an RF signal 125 to the DAUT 30 which generates digital I/Q data 110. The digital I/Q data 110 is sent to the data processing and array control unit 60 of the DAUT 30 for further processing. The data processing and array control unit 60 is a data processing repository configured with various types of high speed and low speed processors and data storage devices.

Regardless of whether the nearfield scanner probe 20 is in Rx or Tx mode, the digital nearfield scanner probe system 22 correlates the digital RF Tx/Rx data to the digital I/Q data 110 from the DAUT 30. The digital-to-digital correlation of the two data streams is enabled by interfacing a digital receiver/exciter ("DRx/Ex") 40 and an onboard processor 50 to format the Rx signal 120 from the nearfield scanner probe 20 and bus the data back to the nearfield data processing and array control station 60. The onboard processor 50 onboard the scanner probe equipment 25 would do the first stage of processing, that is, convert the RF signal to a digital signal. The data processing and array control unit 60 would then be in charge of correlating those digital data points to array data, essentially being the keeper of all data. The signals from the scanner probe's onboard processor 50 is correlated with the array data. Preferably, the DRx/Ex 40 connected to the nearfield scanner probe 20 implements the exact Rx function within the DAUT 30 when the DAUT is in Tx mode, and vice versa when the DAUT 30 is in Rx mode.

The digital nearfield architecture 100 allows for the inclusion of an RF signal drift monitor loop 130 to inject RF signal back onto the nearfield scanner probe's DRxEx 40 itself. By interleaving this drift measurement from the drift monitor loop 130 with the DAUT measurement during the testing of the DAUT 30, the error/drift in the nearfield scanner probe's DRxEx 40 could be monitored and/or subtracted out of the measurement.

The DAUT 30 and the DRxEx 40 at the nearfield scanner probe 20 are tied to the system local oscillator distribution network 70 which is fed from a single low noise central source 80. All timing synchronization is handled by the system reference 85 allowing all equipment and data recording to be in synch with each other creating a digital closed loop architecture.

Setting the Reference and Measuring

One of the challenges facing the development of a digital nearfield is the ability to set the correct reference point to derive phase and amplitude deltas between the DAUT 30 and the nearfield scanner probe 20. These deltas are what are used to form a nearfield pattern and eventually a farfield pattern to assess phased array pattern performance of the DAUT 30. In the digital nearfield system architecture 100 of the present disclosure, a digital reference point can be set at the nearfield scanner probe 20 during synchronization of the digital equipment using the DRxEx 40. A correct reference point is necessary to derive phase and amplitude deltas between the AUT 30 and the nearfield scanner probe 20. Once the reference point is established, the drift monitor loop 130 in the DRxEx 40, will sample the I/Q data 110 at each dwell, i.e. a test event or a command execution in which a set of data points is captured. Conversely, a dedicated calibration channel on the DAUT 30 will have an identical loopback sampling the reference I/Q data established at the DAUT.

Figure 3:
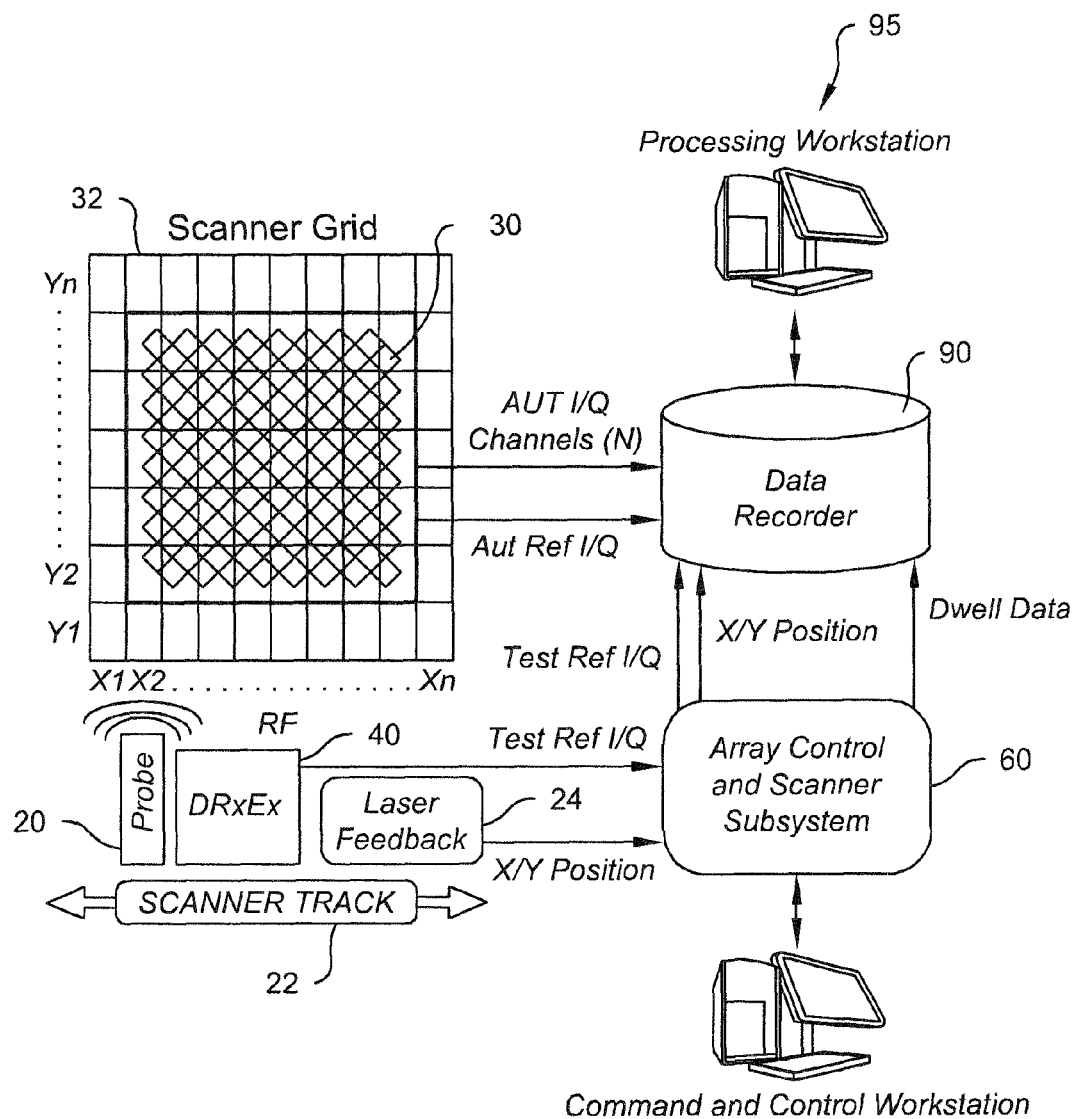
FIG. 3 is a schematic block diagram illustration of a digital nearfield measurement flow (Rx).

With the reference points established, the measurement process can take place by sampling data in the same manner as a traditional nearfield system would. As shown in FIG. 3, for the DAUT receive case, the nearfield scanner probe 20 is used to scan the active aperture 32 of the DAUT 30 where the active aperture 32 is defined into a planar data collection grid of $(X_1 \ldots X_n)/(Y_1 \ldots Y_n)$. The nearfield scanner probe 20 assembly is mounted on a scanner track 22 that is used to scan the nearfield scanner probe 20 through each X/Y grid position on the active aperture 32.

Figure 4:
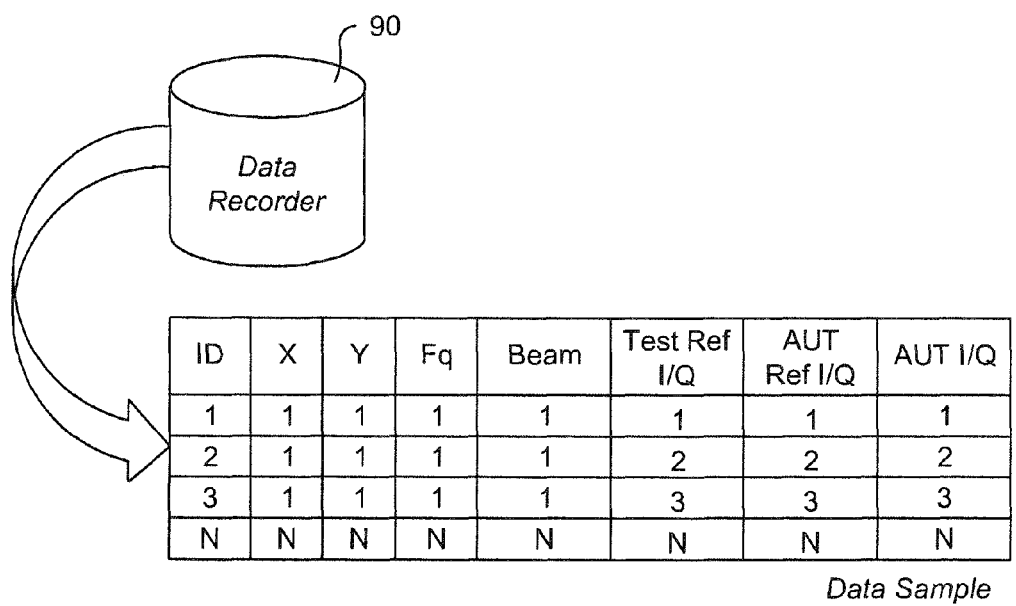
FIG. 4 is a high level illustration of the data collection sample in the digital nearfield architecture of the present disclosure.

As depicted in the high level illustration in FIG. 4, at each X/Y sampling position, the X/Y position data is fed back to the nearfield data processing and array control station 60 in real-time, a sample measurement is taken for each beam steer and frequency (dwell data), X/Y location, DAUT I/Q data, DAUT reference I/Q data, and Test reference I/Q data are stored in a data recorder 90. Each sample point is tagged with an ID and all of the data is correlated by the data recorder 90. Since everything is digital, the data recorder 90 can be configured to be able to take in the data and use a matrix to store and cross correlate the incoming data as shown in FIG. 4. A post processing workstation 95 can then locate and process the desired data set. The post processing workstation 95 is networked to access the data stored in the recorder 90 in non-real-time and post process the data to perform analysis and pattern synthesis.

The benefit of the digital nearfield architecture 100 is its open architecture which allows the nearfield scanner system to be fitted with specific DAUT performance hardware described herein. The openness of the architecture being referred to here is the ability of the digital nearfield architecture 100 to use a piece of the radar itself to test the radar rather than using additional off-the-shelf equipment. If the DAUT can be hooked into the nearfield system, then, any system can do the same operation. Due to the ever changing needs of various radar and phased array programs, the open architecture of the digital nearfield architecture 100 demonstrates the ability to integrate the hardware required to meet the specific performance needs of the radar system without purchasing new equipment as technology evolves. Since all that is required is the ability to capture and reference I/Q data, the burden of being limited by analog receivers/exciters is eliminated.

The open architecture of the digital nearfield architecture provides a clean and cost savings approach to testing a digital phased array. By integrating DAUT specific equipment into the nearfield system, the method of scanning remains the same. Only the data acquisition and manipulation is altered. Some of the improvements over the conventional analog nearfield testing architectures include: better accuracy via elimination of RF cable phase modulation with scanner motion; higher signal-to-noise ratio and therefore greater accuracy/and/or more accurate measurements as opposed to classic analog beamforming tapers for low sidelobes in analog arrays. The digital nearfield architecture of the present disclosure allows any digital receiver/exciter to be installed at the scanner probe along with supporting DAUT specific equipment to deliver the source tones to establish reference points and acquire nearfield measurements.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A digital nearfield testing architecture for nearfield testing of a digital phased array antenna under test, wherein the digital phased array antenna comprises a digital receiver/exciter and an onboard processor, the digital nearfield architecture comprising:

a digital nearfield scanner probe system comprising:
   a nearfield scanner probe connected to the digital receiver/exciter and the onboard processor, wherein when the phased array antenna under test is in transmit mode, the nearfield scanner probe detects RF signal from the phased array antenna under test and sends detected receive (Rx) RF data to the digital receiver/exciter, and when the phased array antenna under test is in receive mode, the digital receiver/exciter generates and sends transmit (Tx) RF data to the digital nearfield scanner probe which then transmits an RF signal to the phased array antenna under test which generates digital I/Q data;
a data processing and array control unit; and
a local oscillator distribution network for synchronizing operations of the components of the digital nearfield architecture,
wherein the digital nearfield scanner probe system correlates the digital RF Tx and RF Rx data to the digital I/Q data from the phased array antenna under test.

2. The digital nearfield testing architecture of claim 1 further comprising an RF signal drift monitor loop between the nearfield scanner probe and the digital receiver/exciter for injecting RF signal back onto the nearfield scanner probe's digital receiver/exciter.

3. The digital nearfield testing architecture of claim 1, wherein the digital receiver/exciter and the onboard processor formats the RF Rx data from the digital nearfield scanner probe and bus the RF Rx data back to the nearfield data processing and array control unit.

* * * * *